April 23, 1968     C. BERGER ETAL     3,379,569

BATTERY HAVING AN INTEGRAL COMPOSITE ELECTRODE-SEPARATOR UNIT

Filed June 14, 1965

CARL BERGER
FRANK C. ARRANCE
INVENTORS

BY Max Gerden

ATTORNEY

United States Patent Office

3,379,569
Patented Apr. 23, 1968

---

3,379,569
BATTERY HAVING AN INTEGRAL COMPOSITE
ELECTRODE-SEPARATOR UNIT
Carl Berger, Santa Ana, and Frank C. Arrance, Costa
Mesa, Calif., assignors, by mesne assignments, to McDonnell Douglas Corporation, Santa Monica, Calif., a corporation of Maryland
Filed June 14, 1965, Ser. No. 463,607
15 Claims. (Cl. 136—6)

ABSTRACT OF THE DISCLOSURE

A rugged essentially one-piece battery construction, comprising a pair of active electrodes of opposite polarity, such as zinc and silver electrodes, and a porous inert inorganic separator between the electrodes for retaining electrolyte and permitting transfer of electrolyte ions, the electrodes and separator being compressed and sintered into an integral composite unit, the electrodes preferably being formed of a mixture of electrode material and of inorganic separator material to bond the separator material with the electrode material and to increase the strength and temperature resistance of the electrodes.

---

This invention relates to batteries, particularly high energy density batteries, and is especially concerned with the provision of an improved battery construction wherein the electrodes and separator are in the form of an integral composite unit, and with procedure for producing such battery.

Batteries are an important source of energy storage for power generation in air-borne systems. An important type of battery particularly suited for such applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead storage batteries. Thus, high energy density batteries can develop, e.g., 100 to 140 watt hours of energy per pound. In addition to important airborne applications, such high enery density batteries have many other applications such as in portable tools and appliances, television, radio and record players, engine starting, portable X-ray units and the like.

In high energy density batteries such as silver-zinc, nickel-cadmium, silver-cadmium, the electrodes are placed adjacent opposite sides of a membrane or separator which performs the function of retaining electrolyte, e.g., potassium hydroxide, separating the electrodes, and preventing migration of electrode ions which short circuit the battery. In the copending applications, Ser. No. 379,093, filed June 30, 1964, of Carl Berger et al., and Ser. No. 378,858 filed June 29, 1964, and now abandoned, of Carl Berger et al., are described improved inorganic separators for this purpose, and which are particularly suited for battery operation at temperatures above 100° C.

However, the physical integrity of zinc and other electrodes used in such batteries is difficult to maintain at room temperature and is particularly difficult to maintain at temperatures of the order of 100° C. and above. Thus, for example, even when the zinc electrode is placed directly in contact with the separator, slumping and segregation of the electrode material towards the bottom of the electrode compartment occurs, making it difficult to maintain good uniform contact between the electrode and the separator and also between the electrode and the electrode screen, and causing changes in electrode characteristics.

The problem of maintaining the physical integrity and durability of a high energy density battery becomes even more acute where such battery is placed in an environment or in equipment which is subject to sudden and large shocks and vibrations. Presently available high energy density batteries generally cannot withstand such treatment over relatively short periods, let alone over an extended period of time, and especially when such batteries are at the same time subjected to elevated temperatures e.g. of the order of about 150° C.

One object of the invention accordingly is to provide an improved battery construction which is strong and rugged and which will retain its physical integrity and operability when subjected to shock and vibrations, particularly a high energy density battery having such characteristics.

Another object is to provide a durable high strength battery construction especially designed as a high energy density battery e.g. a silver-zinc, silver-cadmium or nickel-cadmium battery, and which is operable at high temperatures e.g. of the order of about 150° C., as well as at ambient temperature, and has satisfactory operating characteristics.

Another object of the invention is the design of a novel unitary battery construction, the electrode and separator components of which are held together in secure engagement and having high temperature resistance, such battery being particularly designed as a high energy density battery and particularly suited for air-borne applications, and of small weight capable of being charged and discharged over a large number of cycles.

A still further object is the provision of an improved high energy density battery having one or more of the above characteristics e.g. a silver-zinc battery, which can be readily formed in any desired shape as a composite unit.

Yet another object of the invention is to provide procedure for the fabrication of the improved battery construction of the invention.

Other objects and advantages will appear hereinafter.

According to the invention, a rugged essentially one piece battery construction especially designed for use as a high energy density battery is provided, comprising an integrated electrode-separator composite structure. Such battery construction is produced by forming a layer of a first electrode material, e.g. a zinc electrode material, placing a layer of an inorganic separator material, e.g. an aluminosilicate, over said layer of electrode material, placing a layer of a second electrode material, e.g. a silver electrode material, over said layer of separator material, compressing said layers under substantial pressure, and forming said layers into an integral substantially vibration-proof strong composite unit, preferably by sintering said compacted three layer unit.

In preferred practice and to obtain a composite battery unit according to the invention having electrodes of improved strength and durability in integrated association with opposite sides of the inorganic separator, the electrodes are formed of a mixture of the electrode material, e.g. a silver or a zinc electrode material, with an inorganic separator material such as an alumino-silicate. By employing a suitable proportion of inorganic separator material in combination with the respective electrod materials for forming the electrodes of the composite battery hereof, bonding of such inorganic separator material with the electrode material occurs, conferring additional strength on the resulting compacted and preferably sintered electrodes, and rendering such electrodes more temperature resistant, without adversely affecting the conductivity or resistance of such electrodes.

The invention will be described more fully below in connection with the accompanying drawing wherein.

According to one embodiment of the instant improvements, a composite electrode-separator battery forming a high energy density silver-zinc battery is prepared as follows. A mixture of a zinc electrode material including zinc oxide and an inorganic separator material such as an aluminosilicate is placed in a die and compacted therein to form a first layer. Over this layer is placed a thin layer of inorganic separator material, e.g. an aluminosilicate, and the resulting layer is then moderately compacted. A top layer of a material is then placed over the layer of inorganic separator material, such top layer being a mixture of a silver electrode material, e.g. including silver and silver oxide, and an organic separator material such as an aluminosilicate. This top layer is also subjected to moderate compaction. The unit composed of the three adjacent layers, namely the zinc electrode layer, the inorganic separator layer, and the silver electrode layer, is then subjected to high pressure. The resulting composite is then sintered at high temperature, e.g. of the order of about 2,000° F., for a period, and is then cooled to ambient temperature.

Figure 1:
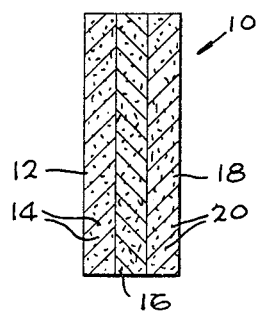
FIG. 1 illustrates one embodiment of a battery formed of an integrated electrode-separator composite according to the invention.

The resulting battery comprising an integral or integrated electrode-separator composite in the form of a durable ceramic unit is illustrated at 10 in FIG. 1, and wherein numeral 12 is the zinc electrode formed of a matrix of zinc electrode material and bonded together by inorganic separator material distributed therein as indicated at 14, said zinc electrode being in secure integral engagement with the intermediate aluminosilicate separator layer 16, and numeral 18 is the silver electrode composed of a silver matrix bonded by inorganic separator material dispersed throughout such matrix as indicated at 20, said silver electrode also being in secure integral engagement with the opposite side of the aluminosilicate separator 16.

The molding and sintering procedure of invention, in addition to producing a hard rugged integrated electrode-separator composite battery unit, has the further advantage that it readily permits the production of a battery of his type having any desired shape. This is of importance in instrumentation where small batteries of a complex shape to fit into a small space of complex dimensions may be required. Thus, for example, referring to FIG. 2 of the drawing a unitary one piece battery 22 can be provided by the procedure described above with respect to production of the battery 10 of FIG. 1, but wherein the zinc and silver electrodes 12a and 18a, respectively, which are integrally connected to opposite surfaces of the inorganic separator 16, are shaped by means of a suitable die in which the unit is compacted, so that the outer surfaces of such electrodes have a convex curvature as indicated at 12b and 18b respectively.

Figure 2:
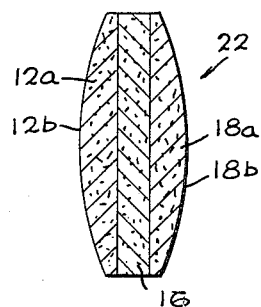
FIG. 2 illustrates another embodiment of the invention wherein the outer surfaces of the electrode have a convex curvature.

The inorganic separator material which can be used to form the inorganic separator, e.g. member 16 in FIGS. 1 and 2 above, and which preferably is also incorporated with electrode material, e.g. the zinc and silver electrode materials, to provide increased strength of the electrodes, as indicated above, can include a variety of inorganic substances. Thus, for example, suitable inorganic separator materials include insoluble hydrous metal oxides such as the hydrous oxides of zirconium, titanium, antimony, tungsten, silicon, scandium, bismuth, vanadium, aluminum and cerium. The term "insoluble hydrous metal oxides" includes those water insoluble materials containing one or more metal atoms, oxygen atoms, and an intermediate quantity of water. The hydrous metal oxides do not necessarily have a definite stoichiometric combination or definite crystal structure and may contain ionic impurities. Such hydrous metal oxide separator materials and their methods of preparation are described in the above mentioned copending application Ser. No. 379,093. A preferred separator of this type is hydrous zirconium oxide or zirconia.

Other porous inorganic materials which can be employed for producing the novel high strength integral batteries of the invention include the aluminosilicates, particularly the alkali metal and alkaline earth metal aluminosilicates, alumina and silica, particulrly because of their formation of a hard ceramic material upon sintering, while still retaining porous characteristics. The aluminosilicates are particularly preferred in this respect because such aluminosilicates have lower internal resistance as compared for example to alumina or silica. Examples of such aluminosilicates include aluminosilicate, sodium and potassium aluminosilicates, and magnesium, calcium, barium and strontium aluminosilicates. These materials can be used separately, but often mixtures of these aluminosilicates are used, e.g. complex mixtures of both the alkali metal and alkaline earth metal aluminosilicates. Such inorganic separator materials are described in the above mentioned copending U.S. application Ser. No. 378,858.

Other types of silicates can also be employed as inorganic separator materials alone or together with the other separator materials noted above. Thus, for example, zircon (zirconium silicate) can be used, and talc (magnesium silicate) can be used alone or as fluxing material.

Another useful class of inorganic separator materials are the naturally occurring clay minerals of the kaolinite group. This is a group of naturally occurring clays containing luminum oxide and silica, usually together with bound water, and having the typical formula

$$Al_2O_3 \cdot 2SiO_2 \cdot 2H_2O$$

In addition to kaolinite, other useful members of this group include the mineral clays halloysite, dickite, nacrite and anauxite.

All of the above inorganic separator materials provide a porous separator when formed into a thin layer by compaction and sintering according to the invention.

Figure 2A:
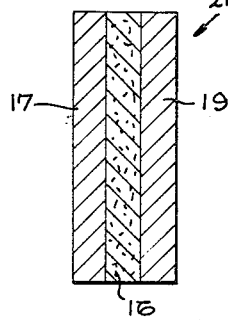
FIG. 2a illustrates another form of integrated electrode-separator according to the invention.

In employing the above noted inorganic separator materials in the invention procedure for producing the composite battery of the invention, a specific inorganic separator material such as an aluminosilicate can be employed for producing the separator, e.g., separator 16 of FIG. 1, and can also be admixed with the electrode materials for producing the electrodes e.g. 12 and 18 of FIG. 1. However, if desired, one type of inorganic separator material such as kaolinite can be employed for producing the separator e.g. 16 and another inorganic separator material such as an aluminosilicate can be employed for admixture with the electrode materials for producing the electrodes. Although in preferred practice, a battery having improved ruggedness can be produced by employing an inorganic separator material as a bonding agent for the electrode materials in producing the electrodes, if desired, inorganic separator material need not be incorporated in the electrode materials. Thus, for example, as illustrated in FIG. 2a, there is shown an integral electrode-separator composite produced by procedure described above, and wherein numeral 17 is a zinc electrode and 19 is a silver electrode, neither of which contains any inorganic separator material, and 16 an aluminosilicate separator. However, the resulting composite battery 21 will not have as much strength as the aforementioned preferred form of battery.

Where, as in preferred practice, a mixture of electrode material and inorganic separator material is employed in forming the electrodes, the proportions of the components of this mixture can range by weight from about 90 parts of electrode material and about 10 parts of inorganic separator material, to about 10 parts of electrode material and about 90 parts of separator material, based on 100 parts by weight of the mixture. Where large amounts of electrode material and small amounts of separator material within the above range are employed, a reduced amount of bonding of the electrode material is provided, so that the resulting battery has reduced mechanical strength and reduced high temperature resistance, but high electrical conductance and high capacity. If small proportions of electrode material and large proportions of inorganic separator material within the above noted range are employed, the battery has high strength, high durability and high temperature resistance but has reduced electrical conductance and capacity. In preferred practice the components of this mixture range by weight from about 90 parts of electrode material and about 10 parts inorganic separator material to about 30 parts of electrode material and about 70 parts of separator material, based on 100 parts by weight of the mixture. The use of approximately equal parts by weight of both the electrode material and inorganic separator material have been found particularly satisfactory.

In carrying out the invention procedure, in preferred practice a mixture of electrode material such as zinc oxide, or zinc and zinc oxide, preferably together with mercuric oxide and polyvinyl alcohol, and a suitable inorganic separator material such as an aluminosilicate in proportions noted above is provided, the resulting mixture placed in a die and moderately compacted at pressures of the order of about 1,000 to about 5,000 p.s.i. Then a layer of an inorganic separator material is placed over the initial electrode material layer and is compacted at pressures noted above. Next the top layer in the form of a mixture of electrode material such as silver and silver oxide, or silver oxide alone, together with inorganic separator material such as aluminosilicate in the proportions noted above, is applied over the second layer of inorganic separator material and this layer is also compacted in the manner noted above. The assembly is then pressed together at high pressures of about 5,000 to about 10,000 p.s.i. Finally, the assembly is sintered at temperatures ranging from about 1,000° F. up to about 3,000° F. and for a suitable period of time which can vary, for example, from about 15 minutes up to about 4 hours.

During discharge of the batteries illustrated in FIGS. 1, 2 and 2a, as is well known, the zinc is converted to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium" and the terms "nickel" and "cadmium," referring to the metals forming the respective electrodes of such battery systems, are intended to denote either the respective metals themselves or the corresponding oxides thereof.

For activation of the batteries illustrated in FIGS. 1, 2 and 2a, the pores of the separator 16, and also if desired, the pores of the electrodes 12 and 18, or 12a and 18a, are filled with an alkaline electrolyte such as potassium hydroxide, sodium hydroxide or lithium hydroxide solution, preferably potassium hydroxide, employing aqueous solutions of about 10% to about 40% strength. Alternatively, and in accordance with the invention described and claimed in our copending concurrently filed application Ser. No. 463,569, filed June 14, 1965, dry or solid alkali, e.g. KOH can be mixed with the separator and/or electrode materials before compaction and sintering. A cell containing such components can be activated by adding water which would then dissolve the alkali, forming the electrolyte solution required to make the battery operative.

The following are examples of practice of the invention, all parts being expressed in terms of parts by weight unless otherwise indicated.

Example 1

About 27 parts zinc oxide, 1.35 parts mercuric oxide and 1.5 parts polyvinyl alcohol are mixed in a vibratory mixer. Then about 30 parts of an aluminosilicate is added to such mixture, such aluminosilicate being in the form of a mixture of sodium and potassium aluminosilicates and calcium, magnesium and barium aluminosilicates.

The resulting zinc oxide-inorganic separator mixture is placed in a two-inch pressing die in amounts sufficient to form an electrode compact of about 0.015 inch thick, and the layer compacted at moderate pressure of about 2,000 p.s.i.

Over this initial layer of material is placed a thin layer of the above noted inorganic aluminosilicate separator material, the amount employed being such as to form a thin layer of the separator. This second layer is then moderately compacted also at about 2,000 p.s.i.

A silver electrode material is prepared by mixing together 15 parts of silver and 15 parts of silver oxide, and to this mixture is added 30 parts of the aluminosilicate material noted above. The resulting mixture is then placed as a third layer in the die over the second layer of inorganic separator material, and this silver-separator mixture layer is then also moderately compacted at about 2,000 p.s.i.

The die containing this battery assembly is then placed is a hydraulic press and compacted at 15 tons total load. The compacted composite unit is then sintered in air to about 1725° F. for two hours and cooled to ambient or room temperature.

For testing the resulting integrated electrode separator composite unit as a battery, palladium electrodes are applied to the two electrode surfaces and the unit is sintered for 5 minutes in air at 1700° F. to securely bond the palladium electrodes to the respective zinc and silver electrodes of the battery. If desired, however, other metals such as platinum or nickel can be applied in place of the palladium in order to provide good contact of the silver and zinc electrodes with the battery terminals.

Figure 3:
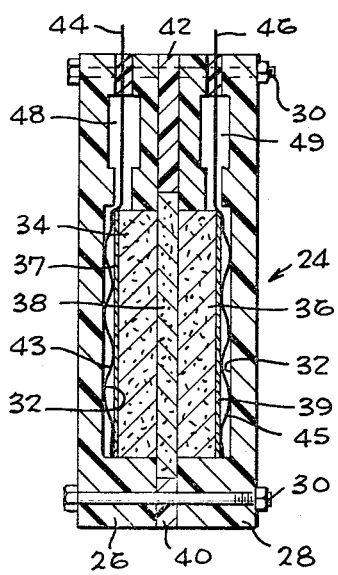
FIG. 3 shows a battery of the type illustrated in FIG. 1, assembled within a case and including electrode components and electrode screens for efficient connection of the battery to an external circuit.

The resulting battery assembly so produced, and of the type illustrated in FIG. 1, is assembled as shown in FIG. 3, employing a plastic case 24 formed of two symmetrical, e.g. Teflon, half portion 26 and 28 which are bolted together as indicated at 30. Compartments 26 and 28 of the case have recesses 32 formed therein to receive the zinc and silver electrodes 34 and 36 respectively, of the composite battery unit described above. The inorganic separator 38 of the battery composite is disposed centrally between the case portions 26 and 28 and extending for a short distance at the top and bottom so as to be disposed and held in position between the half portion 26 and 28 of the case. Teflon spacers 40 and 42 are provided about the periphery of separator 38, to form a leak-proof seal. Fine mesh nickel screens 43 and 45 are positioned in the spaces between the electrodes 34 and 36 and the adjacent side walls of the case, and are urged against the palladium electrodes 37 and 39 which are bonded to the zinc and silver electrodes 34 and 36 respectively, as described above. The nickel screens 43 and 45 are thus clamped against the palladium electrodes 37 and 39 of the composite separator-electrode unit formed of zinc and silver electrodes 34 and 36, the inorganic separator 38 and such palladium electrodes, to insure good electrical contact with the palladium surfaces. Silver terminal wires 44 and 46 are connected respectively to the screens 43 and 45, and are brought through the plastic electrode retaining sections at the top of the assembly as shown. Small electrolyte reservoirs 43 and 49 are provided in the upper portion of the respective electrode compartments 26 and 28.

It will be understood that the palladium electrodes 37 and 39 can be omitted from the above described assembly, with the nickel screens 37 and 39, thus placed or clamped directly against the respective zinc and silver electrodes 34 and 36.

The battery assembly described above and illustrated in FIG. 3 is then saturated with 30% KOH solution and a 5 ma. (milliamps) charging current is applied for about 4 hours. The battery at ambient temperature has an open circuit voltage of 1.8 volts. It is then discharged at 5 ma. for 10 minutes. The voltage ranges from about 1.8 to about 0.5 volt during this discharge period and exhibits the characteristic silver-zinc discharge curve with a plateau at about 1.45 volts. The battery is then recharged at 5 ma. to an open circuit voltage of 1.8 volts and is again discharged at 5 ma. down to a voltage of about 0.5 volt.

The battery described above and illustrated in FIG. 3 is a hard rugged unit which can be subjected to sudden shocks and contiued vibration for periods of time without damage. Such battery is operative at ambient temperatures and at elevated temperatures of the order of about 150° C.

Example 2

A composite battery unit according to the invention as described in Example 1, is prepared by procedure as described in Example 1 except that in place of employing an aluminosilicate for preparing the separator 38, such separator is formed of kaolinite, that is, in the procedure of Example 1 the layer of inorganic material placed between the two layers of electrode material-aluminosilicate separator mixtures is a layer of kaolinite.

The resulting battery assembled in the manner described in Example 1 and illustrated in FIG. 3 has electrical properties similar to that of the battery of Example 1 and also has the ruggedness and resistance to elevated temperature of the battery produced in Example 1.

Example 3

A battery unit according to the invention is produced as described in Example 1 above, except that no aluminosilicate was incorporated either in the zinc electrode material or the silver electrode material. Such a battery composite is illustrated in FIG. 2a.

The resulting composite battery unit comprising zinc and silver electrodes without incorporation of any inorganic separator material for bonding with the electrode materials, and including an aluminosilicate separator, assembled as illustrated in FIG. 3, has electrical properties similar to the electrical properties of the battery of Example 1. However, the battery formed in this example, has less durability and ruggedness than the battery of Example 1, and does not have as high resistance to elevated temperature as the battery of Example 1. However, the integral composite battery of this example has substantially greater strength and ruggedness than the conventional silver-zinc battery, or of a similar silver-zinc battery including an aluminosilicate separator, but which is not compacted and sintered into a composite unit in accordance with the procedure of the invention as described above.

Example 4

A composite battery unit according to the invention is produced by procedure described substantially in Example 1 except that instead of employing a zinc electrode material-separator mixture, 30 parts of a cadmium oxide powder is mixed with 30 parts of aluminosilicate, and also the intermediate inorganic separator layer is composed of zirconia instead of an aluminosilicate.

The resulting composite unitary battery is a silver-cadmium battery according to the invention, in which both the silver and cadmium electrodes contain aluminosilicate bonding material, and the intermediate separator, that is, separator 38 in FIG. 3, is a zirconia separator.

The resulting silver-cadmium battery when assembled in the manner described above and shown in FIG. 3, provides a rugged battery resistant to shocks and vibration and having high temperature resistance, such battery having good electrical characteristics and high capacity, characteristic of a silver-cadmium battery.

Example 5

A battery composite is produced by the procedure substantially as described in Example 1 to provide a battery as illustrated in FIG. 3, except that in place of the zinc and silver electrode materials of Example 1, cadmium and nickel electrode materials are employed. Thus, the first layer of material provided as described in the procedure of Example 1 is composed of a mixture of about 40 parts of powdered cadmium oxide and about 20 parts of an aluminosilicate, and the top layer is composed of a mixture of about 40 parts of green nickel hydroxide and about 20 parts of an aluminosilicate, the intermediate layer being composed of the aluminosilicate separator material.

The resulting sintered composite unit when assembled in a battery as described in Example 1 and illustrated in FIG. 3, forms a rugged durable battery resistant to elevated temperatures and having the electrical characteristics and capacity of a nickel-cadmium high energy density battery.

Example 6

An integrated electrode-separator composite battery is prepared by essentially the procedure described in Example 1 above, but employing 20 parts of total zinc electrode material and 40 parts of aluminosilicate in providing the first layer forming the zinc electrode, and the third layer is formed of a mixture of about 20 parts of silver electrode material and 40 parts of aluminosilicate, the intermediate inorganic separator layer being composed of halloysite, a kaolinite type material.

The resulting integrated sintered battery composite, when assembled as described in Example 1 and illustrated in FIG. 3, forms a durable rugged battery resistant to high temperatures and which has electrical properties similar to the electrical properties of the battery described in Example 1, except for somewhat lower electrical conductivity of the zinc and silver electrode as result of the larger proportion of aluminosilicate bonding material contained in such electrodes.

Example 7

A composite battery unit is prepared by procedure described substantially in Example 1, except that the intermediate inorganic separator layer is composed of zirconia instead of an aluminosilicate.

The resulting silver-zinc composite battery, in which both the silver and zinc electrode contain aluminosilicate bonding material and the intermediate separator is a zirconia separator, when assembled in the manner described above and shown in FIG. 3, provides a rugged battery resistant to shocks and vibration and having high temperature resistance, such battery having good electrical characteristics similar to the battery of Example 1.

It will be understood that the principles of the invention can be employed for production of either a single plate cell e.g. of the type illustrated in FIG. 3, or for production of multiple plate cells containing a multiplicity of alternate electrodes of opposite polarity such as zinc and silver electrodes, separated by inorganic separators of the type described above. Since the sintered composite electrode-separator units are strong and durable, batteries fabricated from a plurality of such composites bonded together by pressure and sintering are also strong and rugged.

It will be understood that the high energy density batteries of the invention can be employed as primary or secondary batteries, which can be activated by adding an alkaline, e.g. potassium hydroxide, solution thereto when power is required. Because of the resistance to high temperatures of the battery of the invention, such batteries can be heat sterilized without damage to electrodes or separator.

It will be understood from the above that the principles of the invention can be employed for production of any type of high energy density battery system, including silver-zinc, silver-cadmium, nickel-cadmium, and the like.

From the foregoing, it is seen that the invention provides novel strong unitary high energy density composite electrode-separator battery units which are extremely rugged, have high resistance to elevated temperatures because of the nature of the sintered ceramic materials of which the elements are constructed, and have good electrical operating characteristics. Such battery composites are readily produced, and the electrodes of such composite battery can be formed into any desired shape to enable the resulting battery to fit into small and complex shaped spaces provided in a system or equipment.

While we have described particular embodiments of the invention for purposes of illustration, it will be understood that the invention is not to be taken as limited except by the scope of the appended claims.

We claim:

1. A battery comprising a pair of electrodes of active material having opposite polarity and a porous inert inorganic separator between said electrodes for retaining electrolyte and permitting transfer of electrolyte ions, said electrodes and separator being compressed and sintered into an integral composite unit.

2. A battery comprising a pair of electrodes of active material having opposite polarity and a porous inert inorganic separator between said electrodes for retaining electrolyte and permitting transfer of electrolyte ions, said electrodes being formed of a mixture of electrode material and of inorganic separator material, and said electrodes and separator being compressed and sintered into an integral composite unit said inorganic separator material being bonded with said electrode material in said electrodes.

3. A battery comprising a pair of electrodes of active material having opposite polarity and a porous inert inorganic separator between said electrodes for retaining electrolyte and permitting transfer of electrolyte ions, said electrodes being formed of a mixture of electrode material and of inorganic separator material, in proportions of about 90 parts of electrode material and about 10 parts of inorganic separator material, to about 10 parts of electrode material and about 90 parts of separator material, based on 100 parts by weight of the mixture, and said electrodes and separator being compressed and sintered into an integral composite unit said inorganic separator material being bonded with said electrode material in said electrodes.

4. A battery as defined in claim 3, said inorganic separator and said inorganic separator material being composed of a member selected from the group consisting of insoluble hydrous metal oxides, aluminosilicates, alumina, silica, zircon and talc.

5. A battery as defined in claim 3, wherein said inorganic separator is an aluminosilicate separator.

6. A battery as defined in claim 3, wherein said inorganic separator is an aluminosilicate separator, and said inorganic separator material is an aluminosilicate.

7. A battery as defined in claim 3, wherein said inorganic separator is a kaolinite separator.

8. A battery as defined in claim 3, wherein said inorganic separator is a kaolinite separator, and said inorganic separator material is an aluminosilicate.

9. A secondary high energy density battery which comprises zinc and silver electrodes and a porous inert aluminosilicate separator, said zinc and silver electrodes being integrally mounted on opposite sides of said separator, and said electrodes and separator being compressed and sintered into an integral composite unit.

10. A secondary high energy density battery which comprises zinc and silver electrodes and a porous inert aluminosilicate separator, said zinc and silver electrodes being integrally connected to opposite sides of said separator, said zinc electrode being formed of a mixture of zinc electrode material and an aluminosilicate, said silver electrode being formed of a mixture of silver electrode material and an aluminosilicate, each of said electrode material and aluminosilicate mixtures containing about 90 parts of electrode material and about 10 parts of aluminosilicate, to about 30 parts of electrode material and about 70 parts of aluminosilicate, based on 100 parts by weight of the mixture, and said electrodes and separator being compressed and sintered into an integral composite unit.

11. A secondary high energy density battery which comprises zinc and silver electrodes and a porous inert kaolinite separator, said zinc and silver electrodes being integrally connected to opposite sides of said separator, said zinc electrode being formed of a mixture of zinc electrode material and an aluminosilicate, said silver electrode being formed of a mixture of silver electrode material and an aluminosilicate, each of said electrode material and aluminosilicate mixtures containing about 90 parts of electrode material and about 10 parts of aluminosilicate, to about 30 parts of electrode material and about 70 parts of aluminosilicate, based on 100 parts by weight of the mixture, and said electrodes and separator being compressed and sintered into an integral composite unit.

12. A secondary high energy density battery which comprises zinc and silver electrodes and a porous inert zirconia separator, said zinc and silver electrodes being integrally connected to opposite sides of said separator, said zinc electrode being formed of a mixture of zinc electrode material and an aluminosilicate, said silver electrode being formed of a mixture of silver electrode material and an aluminosilicate, each of said electrode material and aluminosilicate mixtures containing about 90 parts of electrode material and about 10 parts of aluminosilicate, to about 30 parts of electrode material and about 70 parts of aluminosilicate, based on 100 parts by weight of the mixture, and said electrodes and separator being compressed and sintered into an integral composite unit.

13. A battery comprising a pair of electrodes of active material having opposite polarity and a porous inert inorganic separator between said electrodes for retaining electrolyte and permitting transfer of electrolyte ions, said electrodes and separator being compressed and sintered into an integral composite unit, and an electrolyte composition in the pores of said separator.

14. A battery comprising a pair of electrodes of active material having opposite polarity and a porous inert inorganic separator between said electrodes for retaining electrolyte and permitting transfer of electrolyte ions, said electrodes being formed of a mixture of electrode material and of inorganic separator material, and said electrodes and separator being compressed and sintered into an integral composite unit, said inorganic separator material being bonded with said electrode material in said eelctrodes, and an aqueous electrolyte solution in the pores of said separator.

15. A secondary high energy density battery which comprises zinc and silver electrodes and a porous inert aluminosilicate separator, said zinc and silver electrodes being integrally mounted on opposite sides of said separator, and said electrodes and separator being compressed and sintered into an integral composite unit, and an aqueous alkaline electrolyte solution in the pores of said separator.

References Cited
UNITED STATES PATENTS

| | | | |
|---|---|---|---|
| 3,132,054 | 5/1964 | Carson | 136—137 |
| 3,272,653 | 9/1966 | Solomon et al. | 136—6 |
| 2,422,045 | 6/1947 | Ruben | 136—107 |
| 3,116,173 | 12/1963 | Raper | 136—175 |
| 3,257,239 | 6/1966 | Shultz et al. | 136—86 |
| 3,266,940 | 8/1966 | Caesar | 136—86 |
| 3,300,344 | 1/1967 | Bray et al. | 136—86 |

ALLEN B. CURTIS, *Primary Examiner.*

WINSTON A. DOUGLAS, *Examiner.*

D. L. WALTON, *Assistant Examiner.*